United States Patent [19]
Loshbough

[11] 3,826,319
[45] July 30, 1974

[54] SCALE MOTION DETECTOR
[75] Inventor: Richard C. Loshbough, Temperance, Mich.
[73] Assignee: Reliance Electric Company, Toledo, Ohio
[22] Filed: Oct. 26, 1973
[21] Appl. No.: 409,861

Related U.S. Application Data
[62] Division of Ser. No. 373,907, June 27, 1973.

[52] U.S. Cl............. 177/25, 177/DIG. 1, 177/DIG. 3
[51] Int. Cl.............................................. G01g 23/22
[58] Field of Search............ 177/DIG. 1, DIG. 3, 25

[56] References Cited
UNITED STATES PATENTS
3,665,169  5/1972  Henderson et al.............. 177/25 X
3,741,324  6/1973  Boshinski et al................ 177/DIG. 1
3,770,069  11/1973  Loshbough.................... 177/DIG. 1

*Primary Examiner*—George H. Miller, Jr.
*Attorney, Agent, or Firm*—Thomas H. Grafton

[57] ABSTRACT

In combination with a system for weighing a load placed on a load receiver and for displaying the measured weight on a digital indicator, a circuit connected to blank the indicator whenever a predetermined degree of motion of the article receiver is detected. Provisions may also be made to blank the indicator when the weight capacity of the system has been exceeded and, in a price computing scale system, to set the computed value to zero whenever the weight indicator is blanked.

2 Claims, 2 Drawing Figures

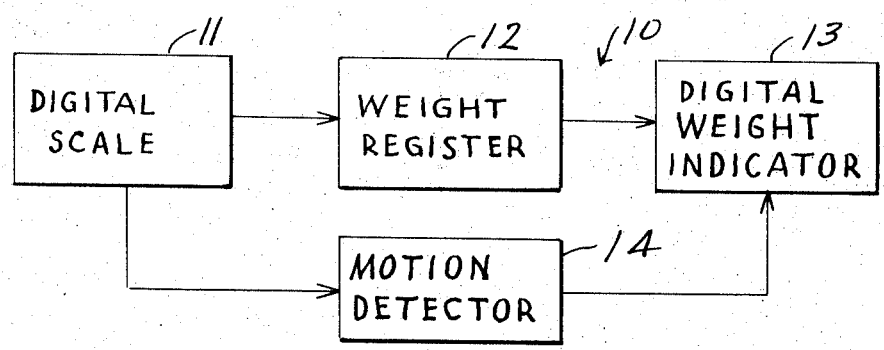
FIG-1-
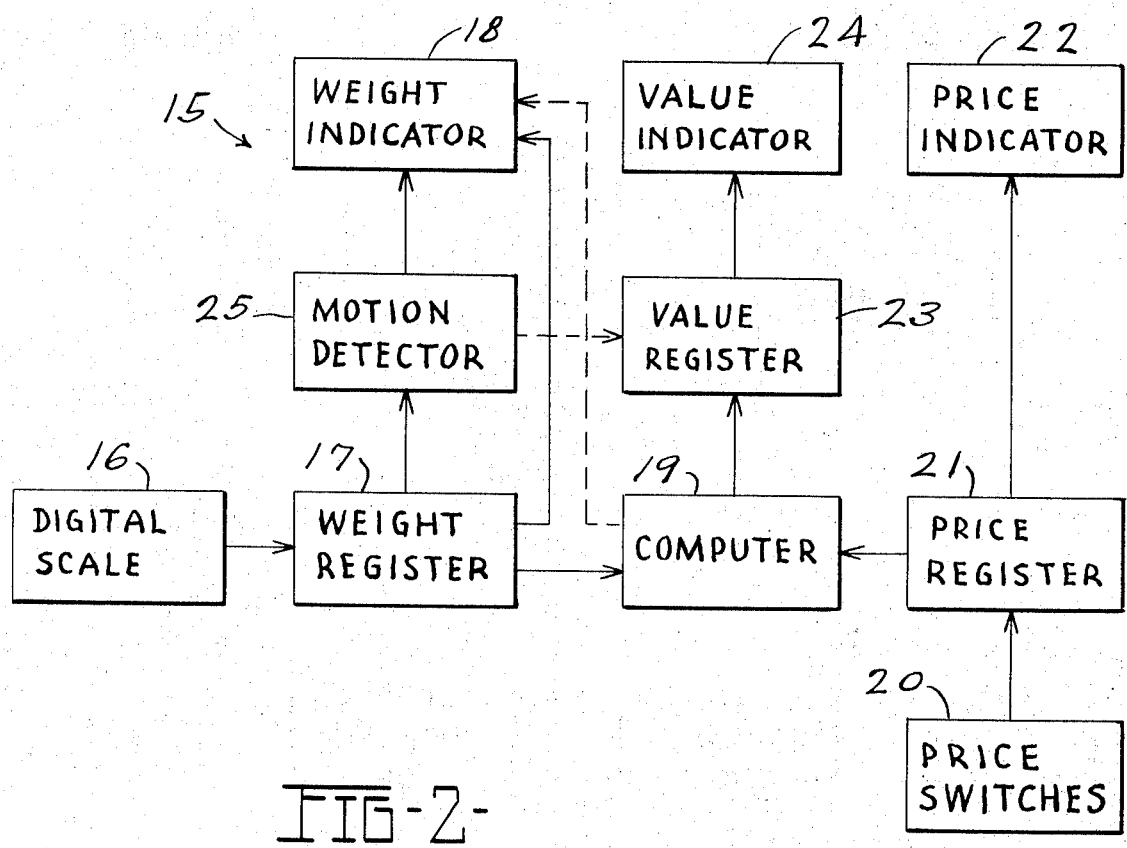
FIG-2-

SCALE MOTION DETECTOR

This is a division of application Ser. No. 373,907, filed June 27, 1973.

BACKGROUND OF THE INVENTION

This invention relates to weight measuring and more particularly to an improved weight measuring system having means for preventing an erroneous reading on a digital weight indicator.

Early in the development of the weighing art, scales were generally of a balance type in which a weight is moved along a balance arm until a balanced condition is reached. The weight reading was then taken by noting the location of the weight on the balance arm. Such scales were often very slow to operate. As the art advanced, spring type scales were developed which were provided with a graduated chart which aligned with a marker for indicating weight. However, even with this advance care had to be taken to prevent making an erroneous weight reading. More recently, the scale art has advanced from analog to digital techniques. With this advance, many scales today are provided with indicators which digitally display measured weight to a very high degree of accuracy. However, there still has been some problems with maintaining a high degree of accuracy with digitally indicating scales. These problems are generally attributable to the scale operator. One problem occurs when a relatively small amount of motion is present in a load being weighed. In this case, as with the earlier prior art scales, an operator may take an erroneous reading if he merely glances at the indicated weight without pausing to see if such weight is changing. Another problem occurs when there is a larger amount of motion. Here, it may be annoying to look at the weight indicators which are rapidly changing and blinking. This may occur either as the indicator approaches the weight of the load or as the load oscillates the load receiver prior to reaching a steady state condition. Still another form of error is directly attributable to the scale operator. A dishonest operator may place his hand on the load receiver in an attempt to increase the indicated weight. This would most likely occur in a retail sales transaction where an article is being priced according to weight.

SUMMARY OF THE INVENTION

According to the present invention, many problems with prior art digital weight indicating scales have been solved by providing such scales with means for blanking the weight indicator during the presence of motion on the scale. The scale may include, for example, either a mechanical-optical device or an electronic device for generating a signal corresponding to the weight on a platter or other load receiver and a suitable decoder for providing the weight signal in a digital format. The digital weight signal is stored in a weight storage register and applied to a digital indicator, such as Nixie tubes or seven-segment readout devices.

A conventional prior art motion detector circuit is also connected to either the scale or the weight register for detecting changes in the measured weight. The motion detector is designed such that a first signal is generated when induced motion of the load receiver exceeds a predetermined acceptable level and a second signal when such induced motion is within such level. The first signal is then used to blank the weight indicator either by removing power to at least a portion of the indicator or by clearing the weight register to zero.

A scale incorporating the present invention may be a portion of a larger system such as a system for weighing, computing and displaying the weight and value of articles. Such systems are typically used in food markets for weighing and pricing meats and similar commodities. The motion detector may be used not only to blank the weight display during motion, but also to preset a register which stores the computed value to zero so that a value indicator will display zero as long as motion is induced in the load receiver.

Accordingly, it is a preferred object of the present invention to provide an improved scale having a digital weight indicator.

Another object of the invention is to provide means for blanking a digital weight indicator while the weight is changing.

Other objects and advantages of the invention will become apparent from the following detailed description, with reference being made to the accompanying drawings.

BRIEF DESCRIPTION OF THE DRAWINGS

FIG. 1 is a block diagram of weight measuring and indicating apparatus according to the present invention; and FIG. 2 is a block diagram of a modified embodiment of weight measuring and indicating apparatus according to the present invention adapted to a system for weighing, computing and displaying the weight and value of articles.

DESCRIPTION OF THE PREFERRED EMBODIMENTS

Referring now to FIG. 1, weight measuring apparatus 10 is shown embodying the principles of the present invention. The apparatus 10 comprises a digital scale 11 adapted to generate a digital signal corresponding to the weight of a load on a weight receiver (not shown). The digital signal is stored within a weight register 12 which is connected to a digital weight indicator 13. The weight indicator 13 may consist of a plurality of Nixie tubes, Numatrons, seven-segment readout devices, or similar types of electrically controlled digital indicators.

The digital scale 11 may be of any conventional type, such as a mechanical-optical device or an entirely electronic device. A typical mechanical-optical weighing system is shown in U.S. Pat. No. 3,453,422 which issued on July 1, 1969 in the name of William C. Susor. In this system, a load responsive lever moves a coded chart in the path of a light beam. The degree of movement of the coded chart is detected by a plurality of photoelectric cells. The outputs of the photoelectric cells are used for generating a digital signal corresponding to the weight of a load being measured by the system. One prior art electronic weighing system is shown in U.S. Pat. No. 3,709,309 which issued on Jan. 9, 1973 in the name of Roger B. Williams, Jr. et al. In this system, the weight being measured is placed on a load cell. The output of the load cell is amplified and applied to an analog-to-digital converter for obtaining a digital signal proportional to the weight on the load cell. It will, of course, be appreciated that these patents are only representative of digital weighing apparatus which are suitable for use as the digital scale 11.

Either the weight of the load measured by the scale 11 or the weight stored in the register 12 is applied to a motion detector circuit 14 which detects when the measured weight changes by more than a predetermined acceptable amount. The motion detector 14 is connected to the digital weight indicator 13 for blanking such indicator 13 whenever motion is detected. Blanking is preferably achieved by means of removing power from at least a portion of the weight indicator 13. However, it will be appreciated that blanking may also be achieved by mechanically moving a shutter mechanism to block the weight indicator 13.

A number of different prior art motion detection devices are suitable for use with the present invention. One type of device is disclosed in U.S. Pat. No. 3,130,802 which issued on Apr. 28, 1964 in the name of Robert E. Bell. In this device, the weight chart in a mechanical-optical weighing system is provided with an opaque column having spaced transparent lines. When a predetermined amount of motion is induced in a load receiver, the transparent lines move past two photoelectric cells which detect such motion and generate a motion signal. When a lesser, acceptable amount of motion is present, at most one transparent line will move past a photoelectric cell. A type of digital motion detector is disclosed in U.S. Pat. No. 3,674,097 which issued on July 4, 1972 in the name of Richard H. Gile. In this device, several successive digital weight readings are stored in registers. The stored weights are compared to detect the degree of induced motion in the load receiver. Still another motion detector is shown in the Williams, Jr. et al. U.S. Pat. No. 3,709,309. This patent discloses a device which senses when the absolute value of the differential of an analog weight signal from a load cell is above or below a predetermined level to indicate the presence or absence of motion. It will, of course, be appreciated that the motion detector 14 may consist of other known types of motion detecting devices. Such motion detecting devices are generally used in combination with weighing systems which automatically print a record of the measured weight. The motion detector is used to detect when the measured weight has settled down to a uniform value and then causes the record to be automatically printed.

It is generally desirable to blank the entire weight indicator 13 while the load receiver is in motion. However, in some instances, it may be desired to blank only the weight digits which are in motion. Here, the weight will be progressively displayed from the most significant digit to the least significant digit as the load receiver approaches a steady state condition. For example, assume that a weight of 10.3 pounds is placed on a load receiver. Initially, the entire weight indicator 13 will be blanked. When the load receiver is deflected to within the range of 9.50 pounds and 19.49 pounds, the indicator 13 will show 1X.X pounds, where the X represents the blanked portion of the indicator 13. As the load receiver approaches steady state and the sensed weight falls to within the range of 9.50 and 10.49 pounds for a predetermined time, the indicator 13 will show a weight of 10.X pounds. Finally, when the sensed weight settles down to within the range of 10.25 pounds and 10.34 pounds for a predetermined time, the indicator 13 will show the final weight of 10.3 pounds.

Turning now to FIG. 2, a modified embodiment of the invention is shown in apparatus 15 for weighing, computing and displaying the weight and value of articles. Such systems are commonly used in grocery stores, delicatessens and similar businesses where retail sales transactions are made. These systems may also be combined with a label printer for pricing pre-packaged items. A typical system of this type is shown in U.S. Pat. No. 3,384,193 which issued on May 29, 1968 to William C. Susor et al. and in the related Susor U.S. Pat. No. 3,453,422.

The apparatus 15 again includes a conventional digital scale 16 which measures and stores the weight of a load in a weight register 17. The output of the weight register 17 is applied to a digital weight indicator 18 and also to a computer 19. A plurality of switches 20 are provided for entering a price per pound, or price per other unit weight, into a price register 21. The price register 21 is connected to a digital price indicator 22 and is also connected to the computer 19. The computer 19 is programmed to periodically compute a value for the weighed load and to store such computed value in a register 23. The value stored in the register 23 appears on a digital value indicator 24.

As in the embodiment of FIG. 1, the output of either the weight register 17 or a digital or analog output from the digital scale 16 is connected to a motion detector 25. When the motion detector 25 senses that motion in the measured weight exceeds a permissible amount, a signal is applied to blank the weight indicator 18. At the same time, a signal may also be provided from the motion detector 25 for either blanking the value indicator 24 or for clearing the value register 23 to zero. Thus, an erroneous value will not appear on the display 24 while the load receiver is in motion. A signal may also be applied from the computer 19 for blanking the weight indicator 18. Such signal is preferably provided whenever the maximum weight capacity of the apparatus 15 has been exceeded and also whenever the maximum capacity of the value register 23 and the value indicator 24 has been exceeded. However, blanking the displayed weight under these circumstances is known in the prior art, as disclosed in the Williams, Jr. et al. U.S. Pat. No. 3,709,309.

It will be appreciated that various changes and modifications may be made in the above-described embodiments of the invention without departing from the spirit and the scope of the claimed invention.

What I claim is:

1. A system for weighing, computing and indicating the weight and value of articles comprising, in combination, means for receiving an article to be weighed, means for generating a weight signal corresponding to the weight of an article on said receiving means, such weight signal varying in response to induced motion of said receiving means, digital indicator means responsive to such weight signal for displaying the weight of the article on said receiving means, means for generating a motion signal when said receiving means moves more than a predetermined amount, means for storing price information, computer means for computing the value of the weighed article from the weight signal and the stored price information, digital indicator means for displaying the computed value of the weighed article, and means responsive to such motion signal for setting the displayed value to zero during generation of said motion signal.

2. A system for weighing, computing and indicating the weight and value of articles comprising, in combination, means for receiving an article to be weighed, means for generating a weight signal corresponding to the weight of an article on said receiving means, such weight signal varying in response to induced motion of said receiving means, digital indicator means responsive to such weight signal for displaying the weight of the article on said receiving means, means for generating a motion signal when said receiving means moves more than a predetermined amount, means responsive to such motion signal for blanking said weight indicator means during generation of said motion signal, means for storing price information, computer means for computing the value of the weighed article from the weight signal and the stored price information, digital indicator means for displaying the computed value of the weighed article, and means responsive to such motion signal for setting the displayed value to zero during generation of said motion signal.

* * * * *